(12) United States Patent
Lin et al.

(10) Patent No.: US 9,964,201 B2
(45) Date of Patent: May 8, 2018

(54) LUBRICATION RESERVOIR FOR LEAD SCREW ASSEMBLY

(71) Applicant: Lin Engineering, Morgan Hill, CA (US)

(72) Inventors: Ted T. Lin, Saratoga, CA (US); Abdallah Samaha, San Jose, CA (US)

(73) Assignee: LIN ENGINEERING, INC., Morgan Hill, CA (US)

( * ) Notice: Subject to any disclaimer, the term of this patent is extended or adjusted under 35 U.S.C. 154(b) by 363 days.

(21) Appl. No.: 14/858,935

(22) Filed: Sep. 18, 2015

(65) Prior Publication Data

US 2016/0341302 A1   Nov. 24, 2016

Related U.S. Application Data

(60) Provisional application No. 62/165,702, filed on May 22, 2015.

(51) Int. Cl.
*F16H 57/04* (2010.01)
*F16H 25/20* (2006.01)

(52) U.S. Cl.
CPC ......... *F16H 57/0497* (2013.01); *F16H 25/20* (2013.01); *F16H 25/2003* (2013.01); *F16H 57/0464* (2013.01)

(58) Field of Classification Search
CPC .................. F16H 57/0497; F16H 25/2006
See application file for complete search history.

(56) References Cited

U.S. PATENT DOCUMENTS

| | | | | |
|---|---|---|---|---|
| 2,195,799 | A * | 4/1940 | Parsons | F16H 25/2006 74/441 |
| 2014/0157927 | A1* | 6/2014 | Shindo | F16H 57/0497 74/424.81 |
| 2015/0198223 | A1* | 7/2015 | Samsfort | F16H 25/2006 74/441 |
| 2016/0298757 | A1* | 10/2016 | Miyazaki | F16H 25/2418 |
| 2017/0146114 | A1* | 5/2017 | Chen | F16H 57/0497 |

* cited by examiner

*Primary Examiner* — Terence Boes
(74) *Attorney, Agent, or Firm* — Thomas Schneck

(57) ABSTRACT

A nut driven by a lead screw and stepper motor has an internal concave recess for holding high viscosity grease that is semi-solid at ambient temperature and spaced from the lead screw. Grease flow ensues with lead screw motion causing a slow flow of grease coating the lead screw with a thin coating of grease as the nut travels back and forth over the lead screw. The nut may be an anti-backlash nut or a single member nut with both having a concave recess about the lead screw for the grease.

9 Claims, 2 Drawing Sheets

LUBRICATION RESERVOIR FOR LEAD SCREW ASSEMBLY

CROSS-REFERENCE TO RELATED APPLICATION

This application claims priority from U.S. provisional application Ser. No. 62/165,702, filed May 22, 2015.

TECHNICAL FIELD

The invention relates to lead screw lubrication and, in particular to a lubrication reservoir in a lead screw assembly.

BACKGROUND ART

Lead screws translate rotary motion from a motor or the like into linear motion through a nut. The motor, lead screw and nut form a lead screw assembly. Since lead screws have large surface areas there is considerable friction between a lead screw and a nut that engages the lead screw and converts the rotational motion of the lead screw into linear motion. Such friction is overcome by lubrication, usually with oil.

Exemplary of the prior art is U.S. Pat. No. 6,220,110 that shows a lead screw having oil lubrication using a ball recirculation block with oil storing means wherein a cavity in the ball recirculation block which being not effectively used for circulating balls is utilized for storing lubrication oil. An oil exuding hole is provided to communicate with the oil stored cavity and a turning passage for balls so as to lubricate the moving balls. In order to prevent the lubrication oil remained at a standstill in a certain region in the cavity by its own gravity from failing to lubricate the balls, there is provided an oil containing element with a plurality of oil absorbing and distribution branches to lubricate the balls just passing by the turning passage. Furthermore, the ball recirculation block is formed of two pieces of plastic members bonded by supersonic wave bonding technique so as to achieve reduction of manufacturing cost and ensure perfect oil sealing effect of the ball recirculation block.

In U.S. Pat. No. 6,023,991 a lead screw of the ball follower type is shown to have a screw shaft, a ball screw nut, a plurality of balls contained in the ball screw nut which is in threadable engagement with the shaft so that it is capable of relative movement in the linear axial direction as guided by the rolling of the balls, and a lubricant-containing polymer member that is installed in the ball screw nut in contact with the balls or in slidable contact with screw grooves in the screw shaft. The lubricant seeps out of the polymer member slowly and is supplied not only to the balls but also to the screw grooves, so that it maintains the desired lubricating effect in a consistent and automatic way over an extended period of time.

In U.S. Pat. No. 6,752,245 a ring-like lubricant supply device is shown to be fitted into a recess of a nut member. The lubricant supply device contains a lubricant and is formed in an outer peripheral surface with notches. Tubular members each having an outer diameter larger than the diameter of the notch are inserted into the notches, pushing and widening the notches in a circumferential direction. One end of the tubular member is fitted into a recess of a retaining ring and the retaining ring is fixed to a nut member.

In FIG. 1, a prior art lead screw 11 is shown to be axially driven by a stepper motor 13. The lead screw carries a load member 15 wherein precisely measured rotational motion of the screw 11 translates to precise linear motion of load member 15. The 3-piece nut 17 has first and second members 21 and 23 with internal threads driven by the screw 11. The two members are separated by an annular spacer 25 in a well-known anti-backlash configuration. The annular spacer does not contact the lead screw but has portions surrounding tubular extensions of the first and second members 21 and 23. Lubrication is applied directly to the lead screw and the nut tends to push lubricants to opposed ends of the screw where it does no good.

Thus, one of the problems in prior art lead screw lubrication is that excess lubricant is forced toward opposed distant ends of the lead screw, eventually piling up at the ends. An object of the invention was to provide lead screw lubrication with improved anti-friction qualities while preventing excess lubricant from endwise build up.

SUMMARY OF INVENTION

The above object has been met with a lead screw follower nut having an internal reservoir for a semi-solid lubricant, preferably grease. We have discovered that such a lubricant will exhibit a slow flow on turning of the lead screw due to circulation of lubricant in the reservoir, thereby continuously coating the lead screw with lubricant as the nut moves back and forth. As an example, it has been found that grease becomes slightly less viscous upon lead screw rotation, creating slow flow or creep toward the lead screw to coat the lead screw with a very thin layer of grease. Motion of the follower nut is sufficient to trigger slow flow of grease packed within a cavity or reservoir created in the lead screw nut by means of a subtle and slight lowering of grease viscosity. The reservoir is an internal concave annular recess within the nut, open toward the lead screw with the high viscosity grease spaced a small distance from the lead screw. High viscosity lubricant, such as grease, is a semi-solid that does not flow solely due to gravity but rather flows due to mechanically induced viscosity changes.

DETAILED DESCRIPTION

Figure 1:
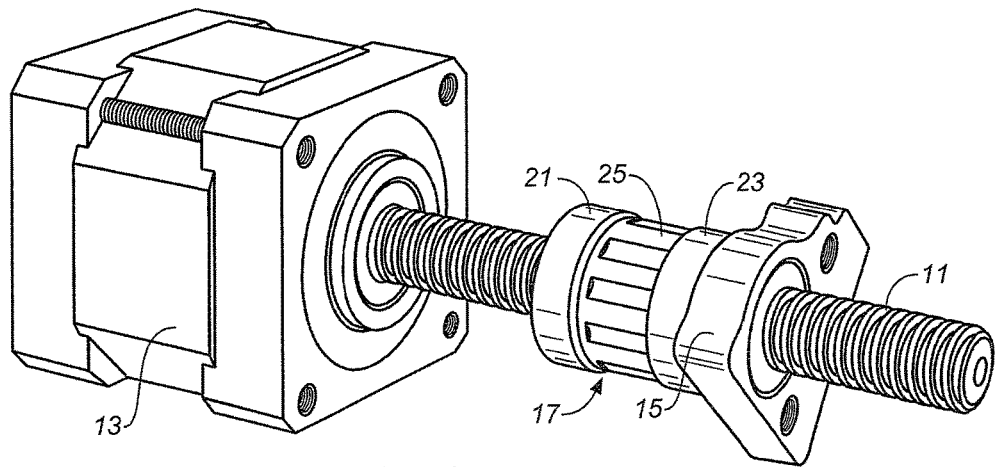
FIG. 1 is a perspective view of a lead screw, follower nut and stepper motor assembly of the prior art.
Figure 2:
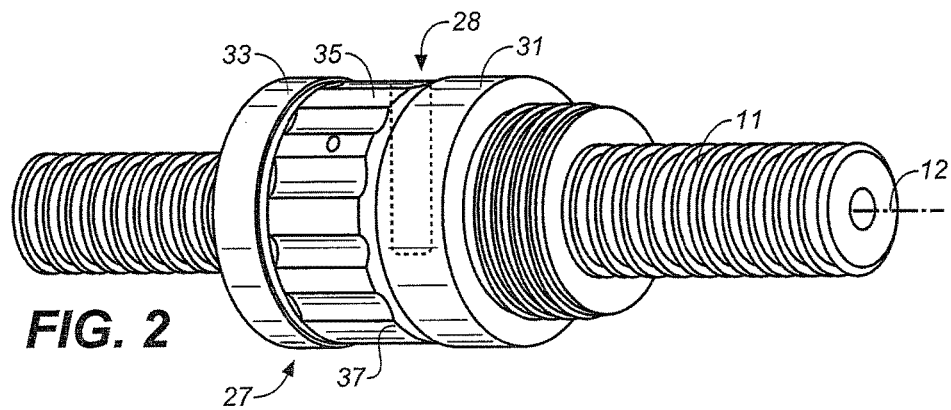
FIG. 2 is a perspective view of a lead screw and nut of the invention.

With reference to FIG. 2, lead screw 11 with helical threads about an axis 12 supports nut 27 with internal threads in driven relation to the lead screw. The nut has a concave recess, indicated by dashed lines 28 wherein the concave recess serves as a lubricant reservoir. The nut that has a first and second tubular members 31 and 33, separated by an annular spacer 35 similar to the anti-backlash nut of the prior art shown in FIG. 1. An optional spring washer 37, not used in prior art anti-backlash nuts, limits the approach of the tubular members 31 and 33 within the annular spacer 35 as explained below.

Figure 3:
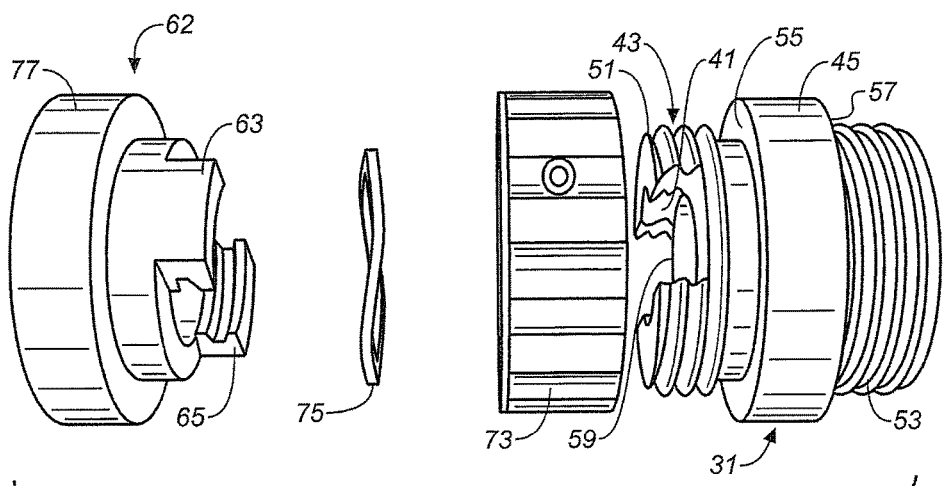
FIG. 3 is a top assembly view of a nut of the kind shown in FIG. 2.

With reference to FIG. 3, a nut of the invention is shown in a disassembled state. A first tubular member 31 is shown on the right with both internal and external threads. A first portion of internal threads 41 of the first tubular member 31 faces the annular spacer 73 and can reside fully within the spacer. The internal threads 41 cannot be seen but are positioned to engage the lead screw. External threads 43 engage internal threads of the spacer, not shown, so that the annular spacer 73 covers the first section 51 of the first tubular member 31. A central annular first boss 45 divides the first tubular member into first and second sections, 51 and 53, respectively. The first boss 45 has upright shoulders 55 and 57 extending transverse to the screw axis. Shoulder 55 limits travel of annular spacer 73 because the spacers abuts the shoulder when the spacer is fully screwed onto the external threads of the first tubular member.

Of particular interest in the first tubular member 31 is the concave recess 59 that appears as a channel through the first section 51 of tubular member 31. The channel is seen to have a rectangular cross section through the first section 51. The channel is transverse to the axis of the lead screw. A purpose of the channel is to serve as a lubrication grease reservoir of variable dimensions, depending on how much of the channel is closed by the second tubular member 62.

The second tubular member 62 has first and second opposed flange members 63 and 65 that occupy a selected amount of the channel in first section 51 of member 31. Flange members 63 and 65 are built to be sufficiently axially short so that the channel defines a reservoir of desired size. Occupying must occur when the lead screw is not in place because internal threads on the second tubular member on the lead screw would prevent such occupying. There will always be a non-zero volume for the grease reservoir.

The spacer 73 establishes the desired dimensions for the meshing of the flange members 63 and 65 with the channel such that a second annular boss 77 of the second tubular member 62 abuts the spacer. The circumferential periphery of the second annular boss 77, the spacer 73 and the first boss 45 can be about equal, but these are a matter of choice. An annular spring washer 75 placed on tubular member 31 will provide some separation of spacer 83 from the tubular member. When the spacer has a lubrication injection port, the spacer aligns the port over the lubrication reservoir. The spacer and washer also provide an anti-backlash effect. Once the nut is assembled with the desired channel size establishing a concave reservoir within the nut, the lead screw may be inserted onto the nut, with internal threads of the nut engaging threads of the lead screw. Note that grease has not yet been inserted. An injection port is used from an external location on the nut into the lubricant reservoir. More than one port can be used. For example, a small opening or injection port in the spacer faces the reservoir established by the channel. Lubricant, for example, grease is inserted through the injection port to fill the reservoir, supplying grease to a desired extent touching the lead screw. The grease is semi-solid at room temperature. A pair of injection ports may be used, one port diametrically opposite a second port.

The lead screw is inserted into the nut and the nut is loaded with grease. If the lead screw is inserted into the nut before grease is loaded, then two openings may be needed in the spacer so that grease can be loaded on opposed sides of the lead screw.

It is important that the lubricant, preferably grease, have appropriate viscosity, semi-solid at ambient temperatures. In one experiment, grease with viscosity in the range of 150 cSt plus or minus 15 cSt at temperatures up to 40 degrees C. worked well. We found that Molykote G4700, a product and trademark of Dow Corning, is preferred. The grease remains in the reservoir without flow until the nut moves along the lead screw. Motion of the nut causes a slow and slight circulation of grease into the reservoir and onto the lead screw, coating the lead screw sufficiently to avoid friction, but not so thick that grease is pushed across the screw. It is estimated that a continuous grease coating that is in the range of one-thousandth of an inch is continuously applied to the lead screw.

When grease is applied to a lead screw, without the reservoir of the kind described above, as in the prior art, the grease is pushed to ends of the lead screw, while central portions become free of grease and therefore have high friction. The present invention tends to confine grease within the nut region where rotary motion of the lead screw is converted to linear motion onto a load.

Figure 4:
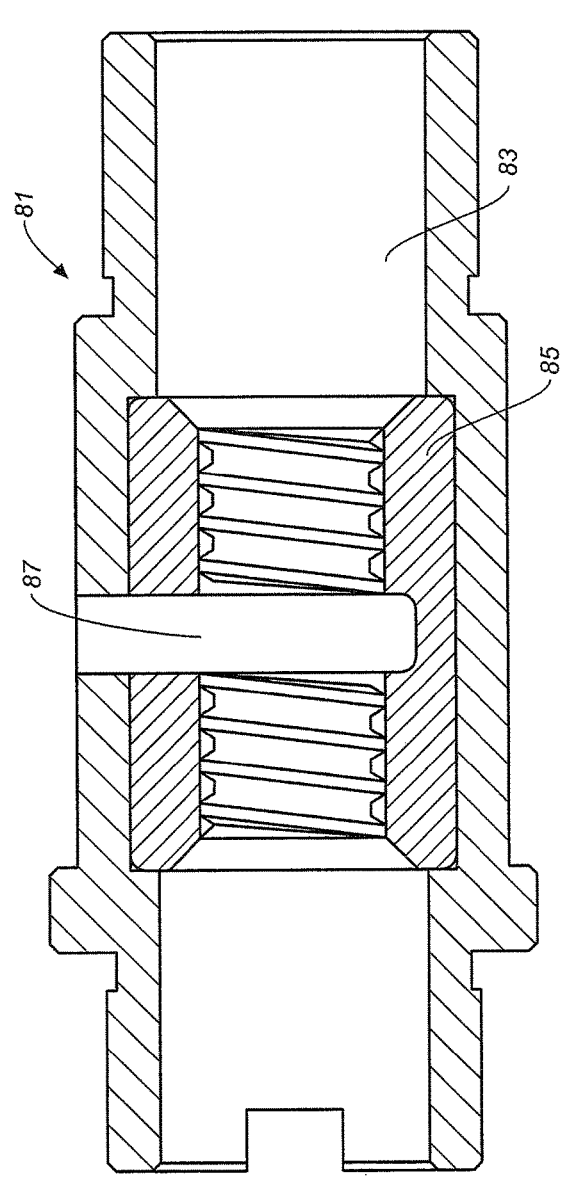
FIG. 4 is a side cutaway view of a nut of an alternative embodiment of the invention.

In the alternate embodiment of FIG. 4, a nut 81 has a threadless first section 83 that is a sleeve and a central threaded second section 85 that engages threads of a lead screw. This embodiment can be within a motor so that the nut is stationary relative to the motor. The motor stator surrounds first section 83. There is a threadless middle concave annular recess 87 in the central section that serves as a grease reservoir. The grease reservoir extends radially outwardly beyond the thread region. This embodiment may be viewed as a plastic nut within a metal sleeve with the central threaded second section being part of the nut, with the annular recess 87 constructed by a machine before threads are applied to the central section. The sleeve is applied over the threaded nut. The first section sleeve 83 can be a motor shaft.

Figure 5:
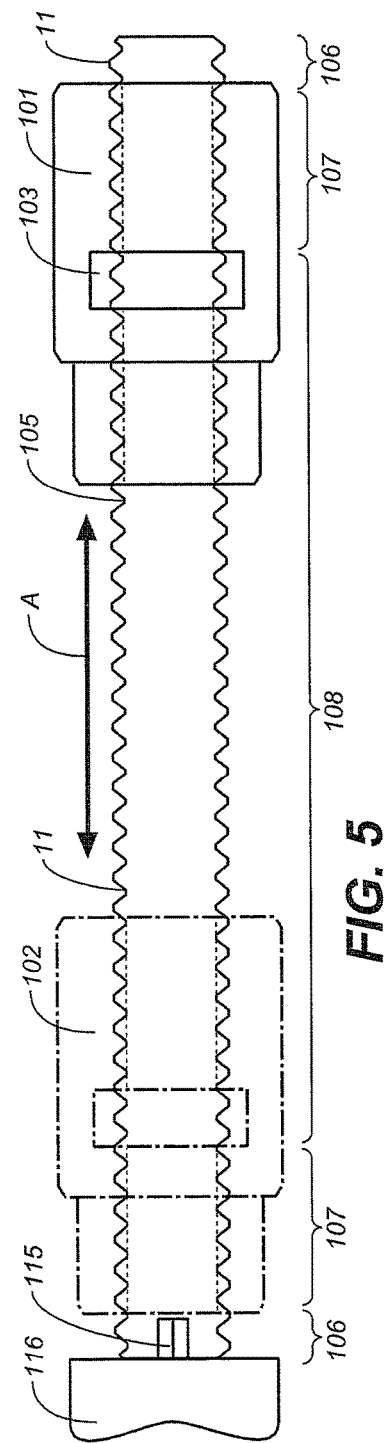
FIG. 5 is a side plan view of a nut of the invention moving on a lead screw.

In operation, with reference to FIG. 5, a nut 101, having an internal grease reservoir 103 with proper viscosity grease of the type described above, moves between a first position on the right side of lead screw 11 to a second position 102, shown in phantom lines on the left side of lead screw 11. Movement between these positions is represented by arrow A. As the nut moves between the two positions, it applies a thin layer of grease 105 to the lead screw, perhaps 0.001 inches thick that is refreshed on back and forth passes by the grease reservoir. Three lubrication regions are shown. The main lubrication region where the nut is active by continuous back and forth passes is the central region 108. Adjacent to central region 108 is a region 107, on both sides of the central region, where grease is pushed by the nut but not continuously coated with flow from the reservoir. Region 107 acts as a seal blocking outflow of grease to region 106. Still further removed from the central region are the outward regions 106, receiving minimal grease at ends of the lead screw, not lubricated by passage of the nut. Note that load structures coupled to the nut can travel in the outward regions 106 but the nut does not.

What is claimed is:
1. A lead screw assembly comprising:
(a) a lead screw driven in rotation by contact with a motor, the lead screw having an axis with helical threads about the axis;
(b) a nut having internal threads in drive relation with the helical threads of the lead screw, the nut having a concave recess forming a lubrication reservoir extending from the lead screw threads transverse to the axis; wherein the nut has a first tubular member with a first portion of said internal threads and external threads about the tubular periphery of the member with a central annular first boss dividing the member into first and second sections, the first boss having upright shoulders extending transverse to the screw axis, the first section of the first member having said concave recess as a channel with a rectangular cross section extending transverse to the axis;

a second tubular member with a second portion of said internal threads and a first section having first and second opposed flange members that fit into the concave recess of the first tubular member, serving to selectively size a volume for said recess, and an annular spacer having internal threads that engage the external threads about the first section of the first tubular member, stopping the approach of the second tubular member towards the first tubular member when the lead screw is inserted into the nut, thereby selecting the volume of the concave recess on the lead screw; and (c) lubricant that is semi-solid at ambient temperatures disposed in the nut recess at a distance spaced from the lead screw helical threads, the lubricant having a flow property upon rotation of the lead screw whereby the lead screw is coated with lubricant upon lead screw rotation.

2. The apparatus of claim 1 wherein an external injection port is disposed in the nut that is open transverse to the lead screw axis and is aligned with the recess for introducing lubricant into the recess.

3. The apparatus of claim 1 wherein an annular spring washer is disposed on the first section of the first tubular member, separating the annular spacer from the first tubular member.

4. The apparatus of claim 1 further comprising a stepper motor driving said lead screw in rotation.

5. The apparatus of claim 1 wherein the concave recess is an annular space within the nut.

6. The apparatus of claim 1 wherein the lubricant is grease that has a viscosity in the range of 135 cSt to 165 cSt at temperature up to 40° C.

7. The apparatus of claim 5 wherein the concave recess is defined in a nut member made of a first material surrounded by a nut member made of a second material.

8. The apparatus of claim 1 wherein the nut is an anti-backlash nut.

9. The apparatus of claim 8 wherein the anti-backlash nut is formed by first and second tubular members separated by an annular spacer and said concave recess is defined by one of the tubular members.

* * * * *